US012517466B2

(12) United States Patent
Lani et al.

(10) Patent No.: US 12,517,466 B2
(45) Date of Patent: Jan. 6, 2026

(54) METHOD FOR PRINTING A FUNCTIONAL ELEMENT ON A TIMEPIECE COMPONENT

(71) Applicant: CSEM Centre Suisse d'Electronique et de Microtechnique SA—Recherche et développement, Neuchatel (CH)

(72) Inventors: Sébastien Lani, Kerzers (CH); Raphael Pugin, Colombier (CH); Nicholas Raymond Hendricks, Zurich (CH)

(73) Assignee: CSEM Centre Suisse d'Electronique et de Microtechnique SA—Recherche et développement, Neuchatel (CH)

( * ) Notice: Subject to any disclaimer, the term of this patent is extended or adjusted under 35 U.S.C. 154(b) by 305 days.

(21) Appl. No.: 18/257,452

(22) PCT Filed: Dec. 15, 2021

(86) PCT No.: PCT/EP2021/085992

§ 371 (c)(1),
(2) Date: Jun. 14, 2023

(87) PCT Pub. No.: WO2022/129229

PCT Pub. Date: Jun. 23, 2022

(65) Prior Publication Data

US 2024/0045380 A1 Feb. 8, 2024

(30) Foreign Application Priority Data

Dec. 17, 2020 (EP) .................................... 20215110

(51) Int. Cl.
*G04D 3/00* (2006.01)
*G04D 7/08* (2006.01)

(52) U.S. Cl.
CPC ........... *G04D 3/0069* (2013.01); *G04D 7/088* (2013.01)

(58) Field of Classification Search
None
See application file for complete search history.

(56) References Cited

U.S. PATENT DOCUMENTS

2014/0035995 A1* 2/2014 Chou .................. C09D 11/322 252/514
2018/0361472 A1 12/2018 Lani et al.
2020/0142359 A1* 5/2020 Lani ..................... G04B 18/006

FOREIGN PATENT DOCUMENTS

CH 715 513 A2 5/2020
CN 108602665 A 9/2018
(Continued)

OTHER PUBLICATIONS

International Search Report issued Mar. 22, 2022 in PCT/EP2021/085992, filed on Dec. 15, 2021, 2 pages.
(Continued)

*Primary Examiner* — Regis J Betsch
*Assistant Examiner* — Michael James Walker
(74) *Attorney, Agent, or Firm* — Oblon, McClelland, Maier & Neustadt, L.L.P.

(57) ABSTRACT

A method that prints a functional element on a surface of a receiving area of a timepiece component of a timepiece contributing to regulating the rate of this timepiece includes preparing a solution containing a material constituting the functional element and depositing the prepared solution onto the surface of the receiving area. Specific properties of the solution are defined as a function of preparation criteria and include at least one structural modification feature of the timepiece component, at least one construction feature of the functional element on the receiving area, at least one structural feature of the material to be applied to the receiving area, and at least one feature of the receiving area of the component.

20 Claims, 2 Drawing Sheets

(56) References Cited

FOREIGN PATENT DOCUMENTS

| | | | |
|---|---|---|---|
| CN | 111142353 | A | 5/2020 |
| WO | WO 2016/203063 | A1 | 12/2016 |

OTHER PUBLICATIONS

Combined Chinese Office Action and Search Report issued Jul. 5, 2025, in corresponding Chinese Patent Application No. 202180081887.X (with English Translation and English Translation of Category of Cited Documents), 9 pages.

* cited by examiner

METHOD FOR PRINTING A FUNCTIONAL ELEMENT ON A TIMEPIECE COMPONENT

CROSS-REFERENCE TO RELATED APPLICATIONS

The present application is a national stage entry of International Application No. PCT/EP 2021/085992, filed Dec. 15, 2021, which claims priority to European Patent Application No. 20215110.6, filed on Dec. 17, 2020, the entire content and disclosure of which are incorporated by reference herein.

TECHNICAL FIELD AND PRIOR ART

The invention relates to a method for printing a functional element on a surface of a receiving area of a timepiece component of a timepiece, as well as to such a timepiece component and to this timepiece.

BACKGROUND OF THE INVENTION

Various methods are known in the prior art for the application of material to a component of a timepiece, in particular when these methods are intended to participate in regulating the rate of a horological movement by adjusting the inertia of a component such as a balance of a sprung balance resonator of such a movement.

In this context, these methods conventionally provide for firstly determining a correction value to be applied to the inertia of the balance in order to obtain a desired rate of this movement, said value being determined from the establishment of a measurement of the rate of the movement of the timepiece. Secondly, they provide for adding material by spraying this material onto the balance in order to adjust the inertia of this balance according to the determined correction value.

However, one of the major drawbacks of such methods lies in the fact that such an addition of material by spraying often causes splashes, resulting in particular from the impact of this material on the balance, said splashes being capable of spreading and contaminating the horological movement and thus causing this movement to malfunction.

SUMMARY OF THE INVENTION

One purpose of the invention is thus to provide a method for the precise and targeted application of a functional element onto a defined receiving area of a timepiece component, which component can be, for example, a balance.

Another purpose of the invention is to provide the possibility of regulating a timepiece including a resonator equipped with such a balance.

Another purpose of the invention is to print a functional element constituted by a controlled quantity of material on the receiving area of the timepiece component.

To this end, the invention relates to a method for printing a functional element on a surface of a receiving area of a timepiece component of a timepiece, contributing to regulating the rate of this timepiece (100), in particular by modifying the inertia and/or the unbalance of this component (1), said method comprising the following steps of:

preparing a solution containing a material constituting said functional element, said preparation step comprising a sub-step of defining specific properties of the solution as a function of preparation criteria, said properties concerning a viscosity and a surface tension of this solution and the preparation criteria comprising:

- at least one structural modification feature of the timepiece component;
- at least one construction feature of the functional element on said receiving area, said features including geometric dimensions, and mechanical, chemical, and aesthetic properties of the functional element to be constructed,
- at least one structural feature of the material to be applied to the receiving area, comprising aesthetic, physical, and chemical properties, such as the density of said material, and
- at least one feature of said receiving area of the component such as geometric dimensions of the surface of the receiving area that can be covered by the functional element, mechanical and chemical properties of the material constituting the area such as adhesion, surface roughness, surface energy, and surface tension properties of the surface of this receiving area, depositing said prepared solution onto the surface of the receiving area.

In other embodiments:

- the preparation step comprises a sub-step of composing a mixture relative to said solution as a function of the defined specific properties of this solution, said sub-step comprising a phase of producing a base preparation containing said material and a base liquid, in particular a solvent;
- the composition sub-step includes a phase of selecting at least one product to be added to said base preparation, said at least one product being chosen from surface tension correction additives such as wetting agents;
- the composition sub-step includes a phase of selecting at least one product to be added to said base preparation, said at least one product being chosen from dispersing agents contributing to the stability of the dispersion of particles of the solid material;
- the step of preparing the solution comprises a sub-step of mixing at least one selected product with the base preparation;
- the deposition step comprises a sub-step of applying the prepared solution to the entire surface of the receiving area;
- the application sub-step is carried out using printing technology of the “aerosol jet”, “high density ink jet”, “pneumatic dispensing”, “extrusion dispensing” or “super ink jet” type;
- the application sub-step comprises a phase of transforming the prepared solution into an aerosol when the printing technology uses an aerosol jet;
- the deposition step comprises a sub-step of solidifying the material of the solution applied to the surface of the receiving area;
- the solidification sub-step starts at the same time or substantially at the same time as the application sub-step and ends after this application sub-step has been completed;
- the definition sub-step comprises a phase of determining said at least one structural modification feature of the timepiece component;
- the definition sub-step comprises a phase of determining said at least one construction feature of the functional element on said receiving area, said construction features including geometric dimensions, and/or mechanical, chemical, and/or aesthetic properties of the functional element to be constructed;

the definition sub-step comprises a phase of determining said at least one structural feature of the material to be applied to said receiving area, the structural features comprising aesthetic, physical, and/or chemical properties, such as the density of said material;

the definition sub-step comprises a phase of determining the features of the receiving area of the timepiece component comprising geometric dimensions of the surface of the receiving area that can be covered by this said layer and/or mechanical and/or chemical properties of the material constituting this area such as adhesion, surface roughness, and/or surface tension properties of this surface of the receiving area;

the specific properties of the definition sub-step also concern a density of said solution;

the material comprises at least one molecular precursor or at least one particle such as a metal or metal oxide particle, a monocrystalline or polycrystalline particle, an amorphous material particle, a ceramic particle, a polymer particle, a pigmented/coloured particle, a colourless particle, a translucent/transparent particle, a fluorescent particle or a phosphorescent particle;

the material comprises at least one particle of the nanoparticle or microparticle type;

the functional element applied to the surface of the receiving area of the timepiece component of the timepiece comprises a decorative/aesthetic element, an element for regulating the operation of a timepiece component such as an inertial mass or an interfacing element;

the method comprises a step of reiterating the deposition step;

the method is a method for printing, in particular by aerosol jet, a functional element on the surface of a receiving area of the component of the timepiece contributing to regulating the rate of this timepiece, in particular by modifying the inertia and/or the unbalance of this component.

The invention further relates to a timepiece component comprising at least one receiving area provided with a surface to which a functional element can be applied using said method.

Advantageously, the component is a balance of the timepiece comprising a regulating face provided with said at least one receiving area capable of comprising the functional element for regulating the rate of the balance, in particular by modifying the inertia and/or the unbalance of this balance.

In particular, the surface of each receiving area is non-planar.

The invention further relates to a timepiece including such a component.

BRIEF DESCRIPTION OF THE DRAWINGS

Other specific features and advantages will be clearly observed in the following description, which is given as a rough guide and in no way as a limiting guide, with reference to the accompanying figures, in which.

DETAILED DESCRIPTION OF THE PREFERRED EMBODIMENTS

Figure 1:
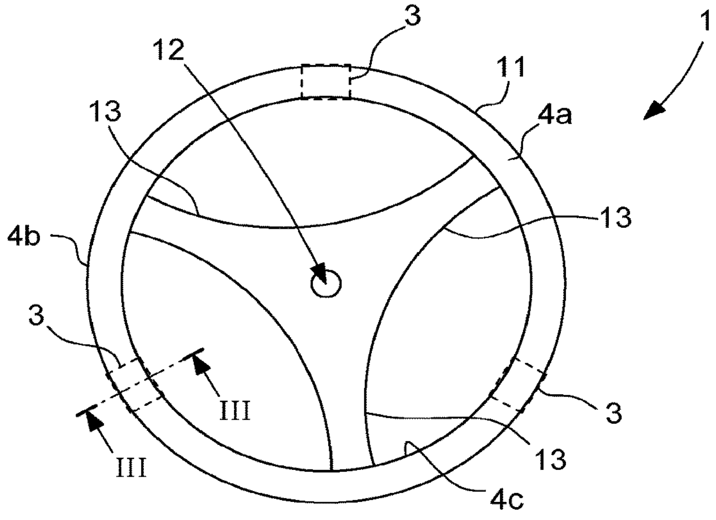
FIGS. 1 and 2 each show a top view of two alternative embodiments of a timepiece component, for example in this case a balance including receiving areas each intended to receive a functional element, according to one embodiment of the invention.

With reference to FIG. 1 to 7, the invention relates to a method for printing a functional element 2 on a receiving surface 5 of a receiving area 3 of a timepiece component 1 of a timepiece 100. It should be noted that such a method is preferably an aerosol jet printing method. It is understood, however, that in other embodiments, this method can implement other printing technologies such as high density inkjet, pneumatic dispensing, auger-driven extrusion dispensing or super inkjet technology. The method can also implement printing technology that provides for the deposition of dot beads using spitting devices such as micro-drops. With the latter printing technology, these dots can be disposed close enough together to form a functional element 2 in a continuous line.

Such a method aims in particular to ensure that this functional element 2 printed on this surface 5 of the receiving area 3 is a functional element 2 which thus has a functional application solely in the horological field. This functional element 2 is, for example, a decorative/aesthetic element, an element for regulating/adjusting the operation of a timepiece component (for example an inertial mass), an interfacing element or an element for the unequivocal identification of the timepiece component.

This functional element 2 is formed by a solid material that can comprise, in a non-limiting and non-exhaustive manner, at least one molecular precursor or at least one particle such as a metal or metal oxide particle, a monocrystalline or polycrystalline particle (such as alumina or silicon), an amorphous material particle (glass, metal, etc.), a ceramic particle, a polymer particle, a pigmented/coloured particle, a colourless particle, a translucent/transparent particle, a fluorescent particle or a phosphorescent particle. Moreover, it should be noted that the particle can be of the nanoparticle or microparticle type.

For a better understanding of the invention, an embodiment is described here, wherein the functional element 2 printed on the surface 5 of the receiving area 3 forms a regulating/adjustment element which is of the inertial mass type. This inertial mass 2 allows a contribution to be made to regulating the rate of the timepiece, in particular by modifying the inertia and/or the unbalance of a timepiece component 1 of this timepiece 100, in this case a balance. Additionally, the invention can also allow, in this context, the inertia and/or the unbalance of a sprung balance alone or of a sprung balance mounted in a movement 110 of the timepiece 100 to be corrected, which movement 110 can be mounted inside a case of this timepiece during the correction operations. It is clearly understood that all of the operations implemented within the scope of the printing method described hereinbelow remain the same, regardless of the type of functional element 2 to be printed on the receiving area 3.

Figure 2:
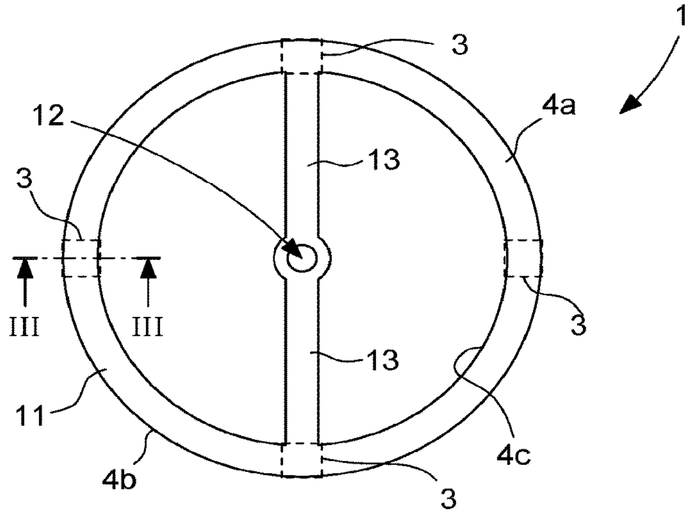
Figure 3:
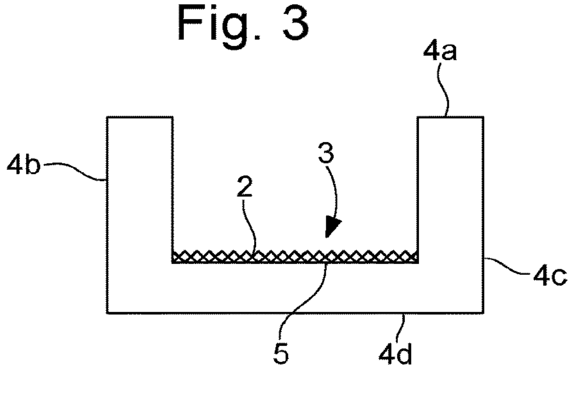
FIG. 3 to 5 show sectional views of three alternative embodiments of the receiving area, according to the embodiment of the invention.
Figure 4:
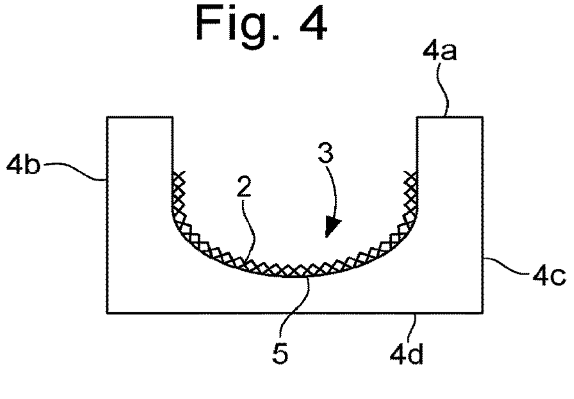
Figure 5:
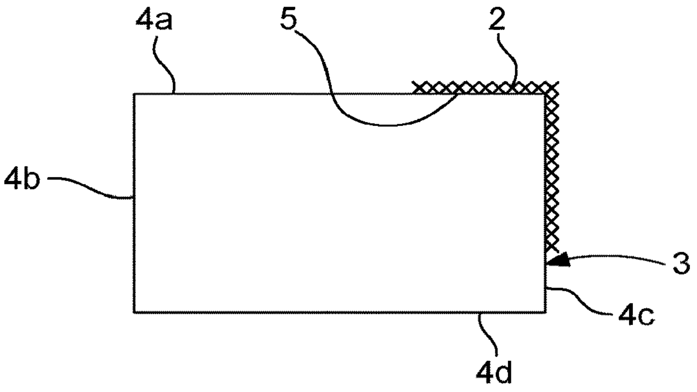
Figure 6:
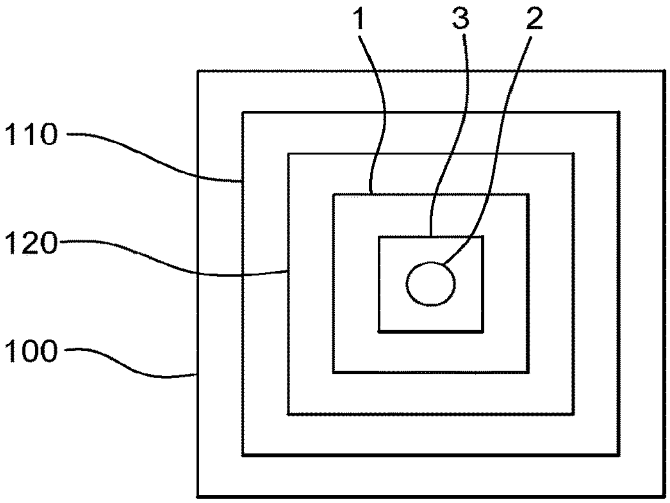
FIG. 6 shows a diagrammatic view of a timepiece comprising such a timepiece component provided with a receiving area comprising the functional element, according to the embodiment of the invention.

Thus, in this context, FIG. 1 shows the balance 1 of a resonator 120 of the sprung balance type of a horological movement 110 of a timepiece 100. Such a balance 1 is provided with said at least one receiving area 3 intended to receive the functional element 2 for regulating the rate of this timepiece 100 and thus of the movement 110 thereof. Such a receiving area 3 can comprise:

- a recess defined in a top face 4*a* of the balance 1 as shown in FIG. 1 to 4, or
- a recess which is not shown here in the figures and which is defined in a bottom face 4*d* and/or in a first side face 4*b* and/or in a second side face 4*c* of this balance 1, or
- a portion of surface of the top face 4*a* and/or of the bottom face 4*d* and/or of the first side face 4*b* and/or of the second side face 4*c* of this balance 1 as shown in FIGS. 1, 2 and 5.

The first and second side faces 4*b*, 4*c* correspond respectively to the outer and inner peripheral walls of the felloe 11. The receiving area 3 comprises the receiving surface 5 of the functional element 2 which can be:

- planar as in the alternative embodiment of the receiving area 3 shown in FIG. 3, or
- non-planar by being curved as shown in FIG. 4 or by comprising sub-surfaces connected to one another in a perpendicular or substantially perpendicular manner as shown in FIG. 5.

Additionally, it should be noted that the receiving surface 5 is defined over all or part of the receiving area 3.

In FIGS. 1 and 2, the balance 1 includes a felloe 11, a hub 12 intended to be rotatably mounted on a balance staff, and one or more arms 13, for example two, three or four arms 13, connecting the felloe 11 to the hub 12. The balance 1 comprises a regulating face comprising at least one receiving area 3 for receiving the functional element 2. This regulating face comprises in particular the top face 4*a* and/or the bottom face 4*d* and/or the first side face 4*b* and/or the second side face 4*c*. This regulating face is preferably oriented towards the back of the case of the timepiece 100 when the balance 1 is comprised within the horological movement 110 which is, for example, mounted inside this case, and so that each receiving area 3 is accessible for printing the functional element 2 on the receiving surface 5 thereof. It should be noted that the top face 4*a* comprises a first part comprised/defined in the felloe 11 of the balance 1 and a second part in the arms 13 of this balance 1. Such a top face 4*a* is planar or substantially planar, and extends in a plane orthogonal to the balance staff.

As already mentioned, with reference to FIGS. 3 and 4, the receiving area 3 can be a recess such as a groove, a cavity or a concave structure, provided with an opening, with a solid bottom which can have a substantially planar surface and with an inner wall connecting said opening to said bottom. A solid bottom must be understood here to mean a bottom without any opening/orifice. In this configuration, the receiving surface 5 is formed by the bottom of this recess as in FIG. 3, or by the bottom and part of the inner wall as in FIG. 4. In the examples shown in these FIGS. 3 and 4, the recesses are defined only in the top face 4*a* of the balance 1, and in particular in the felloe 11, this face 4*a* thus includes a plurality of openings giving access to an internal volume of the corresponding recesses. In this configuration, each recess and thus each corresponding internal volume, is intended to receive the functional element 2 acting as an inertial mass in order to modify the inertia and/or the unbalance of the balance 1.

In an alternative not shown, this recess can be penetrating and form a through-hole or a bottomless hole thus comprising an opening at both ends thereof. In this configuration, the receiving surface is formed by the inner wall of this recess.

In another alternative shown in FIG. 5, the receiving area 3 is not a recess and can thus be defined both on a portion of surface of the top face 4*a* (or bottom face 4*d*) and a portion of surface of one of the two side faces 4*b*, 4*c*. In another alternative, the receiving area 3 can be located only on a portion of surface of the top face 4*a* or bottom face 4*d* or a portion of surface of the side face 4*b*, 4*c*.

In another alternative, the receiving area 3 can be located both:

- on a portion of surface of the top face 4*a* and portions of surface of both side faces 4*b*, 4*c*, or
- on a portion of surface of the bottom face 4*d* and portions of surface of both side faces 4*b*, 4*c*.

The receiving area 3 can be defined in/on the felloe 11 or one of the arms 13 of the balance 1. If the balance 1 includes a plurality of receiving areas 3, these can be distributed only in/on the arms 13 of this balance 1 or only in/on the felloe 11 or in/on the arms 13 and the felloe 11 of this balance 1. Alternatively, if the balance 1 comprises a single receiving area 3, this can be defined in the regulating face over the entire contour of the felloe 11.

In FIG. 1, the felloe 11 includes a plurality of receiving areas 3, for example three areas 3, distributed around the periphery of the felloe 11. Each receiving area 3 extends in a circular arc about an angle comprised, for example, between 5° and 120° and preferably between 20° and 60°. In FIG. 2, the felloe 11 includes a multitude of receiving areas 3, for example four areas 3 or more, which are distributed around the periphery of this felloe 11. These receiving areas 3 extend in a circular arc about an angle of less than 90° and preferably less than 45°. It is understood that the invention can also be implemented for a felloe comprising a single receiving area 3 or two receiving areas 3 or more than three receiving areas 3.

In these two embodiments, the receiving areas 3 can, for example, be distributed evenly around this periphery of the felloe 11 of the balance 1 so as to obtain a symmetrical distribution of the printed functional element 2 in all of the receiving areas 3 or in some thereof, in order to modify the inertia and/or the unbalance of the balance 1 and thus to precisely adjust the rate of the movement 110. In a further example, the receiving areas 3 in the two aforementioned embodiments can be distributed asymmetrically around the periphery of the felloe 11 in order to modify the inertia and/or the unbalance of the balance 1 and the centre of mass thereof by printing the functional element 2 in all of the asymmetric receiving areas 3 or in some thereof. In another example, the receiving areas 3 of the balance 1 are symmetrically distributed on the felloe 11 of the balance 1 and the functional element 2 is printed only in some of these receiving areas 3, those which have an asymmetrical configuration relative to one another.

As mentioned hereinabove, each receiving area 3 opens out onto the regulating face of the balance 1, which face, when it is only constituted by the top face 4*a* and/or the two side faces 4*b*, 4*c*, is intended to be arranged substantially facing the back of the case of the timepiece 100 when the horological movement 110 is mounted inside this case. In such a configuration, it is thus possible to carry out a final regulation of the rate of the horological movement 110 when it is mounted in the middle of the timepiece 100, before assembling the back of the case with the middle, by adjusting a device for applying the functional element 2 above the balance 1 while ensuring that the oscillating weight of this timepiece 100 is disengaged from the resonator 120 of the movement 110 for an automatic-type movement. In this embodiment, the spraying device is capable of implementing an aerosol jet-type printing technology which allows for very precise vaporisation with a very small volume of material.

Figure 7:
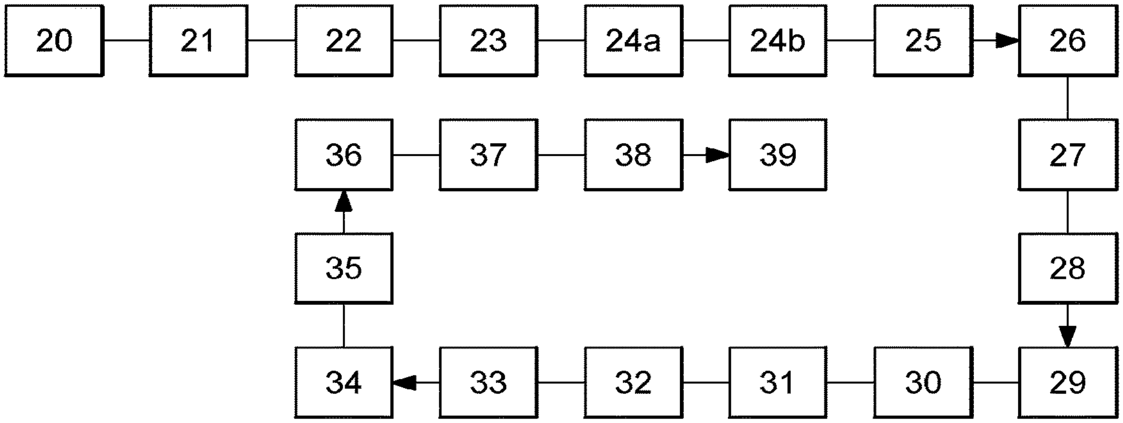
FIG. 7 shows a flow chart relating to a method for printing the functional element on a receiving surface of each receiving area of the timepiece component, according to the embodiment of the invention.

FIG. 7 shows the method for printing the functional element 2 on the surface 5 of the receiving area 3 of the timepiece component 1 of the timepiece 100. More specifically, in the embodiment of the invention described here, the printing of such a functional element 2 on the timepiece component 1, the balance 1 or even a sprung balance, contributes to regulating the rate of the timepiece 100. Under these conditions, such a method is also a method for printing, in particular by aerosol jet, the functional element 2 on the surface 5 of the receiving area 3 of this component 1 of the timepiece 100 contributing to regulating the rate of the timepiece 100, in particular by modifying the inertia and/or the unbalance of this component 1.

Such a method comprises a step of preparing 20 a solution containing said material constituting the functional element 2 to be printed on the timepiece component 1. Such a solution can be in a more or less paste-like or viscous liquid state. In this embodiment, this solution containing this material can thus be an ink, i.e. a liquid solution which can be dried by evaporation or cured by polymerisation after the deposition thereof on the receiving area 3 so as to ensure the application of the solid material to this said area 3.

This preparation step 20 includes a sub-step of defining 21 specific properties of the solution as a function of preparation criteria. In this sub-step 21, the specific properties of the solution relate to the viscosity and surface tension of this solution. In this embodiment, these properties also relate to the density of said solution. The preparation criteria comprise:

- at least one structural modification feature of the timepiece component 1;
- at least one construction feature of the functional element 2 on said receiving area 3;
- at least one structural feature of the solid material constituting the functional element 2 to be applied to said receiving area 3;
- at least one feature of said receiving area 3 of the component 1; and
- at least one feature of the printing technology implemented by the present method.

The definition sub-step 21 comprises a phase 22 of determining said at least one structural modification feature of the timepiece component 1. Within the context of this embodiment of the invention, wherein the application of the functional element 2 to this component 1 is intended to regulate the rate of the timepiece 100, this said at least one structural modification feature comprises a rate correction value resulting from correction values for correcting the inertia and/or unbalance of the balance 1, in order to obtain an adjusted/corrected rate of the horological movement 110 and thus of the timepiece 100.

Also within the context of this embodiment of the invention, wherein the application of the functional element 2 to this component 1 is intended to regulate the rate of the timepiece 100, this determination phase 22 includes a sub-phase 23 of measuring the rate of the horological movement 110. This measurement can preferably be carried out without contact as access to the resonator is particularly narrow. In a known manner, the measurement of the rate of the movement 110 can thus be carried out, for example, using optical and/or acoustic technologies. This measurement sub-phase 23 allows the measured rate to be compared with a desired rate. Additionally, it also allows the beat of the balance 1 to be known so that it can be synchronised with the printing of the functional element 2 on the receiving surface 5 of each receiving area 3 of the balance 1.

Also within the context of this embodiment aiming at regulating the rate of the timepiece 100, the determination phase 22 then includes a sub-phase 24*a* of estimating the correction value of the inertia of the balance 1 to obtain a corrected rate. This correction value is determined by the following known formulae:

For a resonator of the sprung balance type, the moment of inertia I of the balance satisfies the formula:

$$I=mr^2 \tag{1}$$

where m is the mass of the balance 1 and r is the radius of gyration thereof, which also depends on the temperature via the coefficient of thermal expansion of the balance 1.

Moreover, the elastic torque C of the balance spring with a constant section satisfies the formula:

$$C = \frac{Ehe^3}{12L} \tag{2}$$

where E is the Young's modulus of the material used, h is the height thereof, e is the thickness thereof and L is the developed length thereof.

Finally, the frequency f of the resonator 120 comprising the sprung balance satisfies the formula:

$$f = \frac{1}{2\pi}\sqrt{\frac{C}{I}} \tag{3}$$

The determination phase 22 further includes a sub-phase 24*b* of estimating the correction value of the unbalance of the balance 1 to obtain a corrected rate. The estimation of such a correction value is well known in the prior art and is described in particular in documents WO2012007460 and EP2864844A1.

Subsequently, the definition sub-step 21 comprises a phase 25 of determining said at least one construction feature of the functional element 2 on said receiving area 3. During this phase 25, the construction features such as geometric dimensions and/or mechanical, chemical and/or aesthetic properties of the functional element 2 are determined. It should be noted that the geometric dimensions of the functional element 2 determined here relate in particular to the thickness, length, width and/or radius of this functional element 2, allowing the value of the rate correction to be defined. The functional element 2 which is constructed on the receiving area can have a rectangular section or a section representing a portion of a disc. This section depends, in this case, on the surface tensions of the solution and on the receiving surface of the receiving area 3.

This definition sub-step 21 further comprises a phase 26 of determining said at least one structural feature of the material to be applied to said receiving area 3. During this phase 26, the structural features such as aesthetic, physical and/or chemical properties such as the density and surface tension of this material, are determined. It should be noted that this density of the material is that of the same material which will constitute the functional element 2 printed on the receiving area 3 and thus after solidification of this element 2 on this area 3, in particular subsequent to the evaporation of a solvent of the solution.

The definition sub-step 21 further comprises a phase 27 of determining said at least one feature of said receiving area 3 of the component 1. During this phase 27, the features of the receiving area 3 such as geometric dimensions of the surface of the receiving area 3 that can be covered by the functional element 2 and/or mechanical and/or chemical properties of the material constituting this area 3 such as adhesion, and/or surface roughness, and/or surface energy, and/or surface tension properties 5 of the surface of this receiving area 3, are determined.

Moreover, as mentioned hereinabove, several printing technologies can be implemented by the printing method. Under these conditions, such a method provides, during the definition sub-step 21, a phase 28 of determining at least one feature of the printing technology implemented in this method. This phase 28 thus allows the printing technology used to be identified.

Such determination phases, given the reference numerals 25, 26 and 27, are preferably carried out by experimentation on substrates equivalent to the receiving surface 5 of the receiving area 3 of the timepiece component 1 that is to be modified. Such phases can provide for, in a non-limiting and non-exhaustive manner, operations for observing under an optical microscope, for carrying out adhesion tests, optical or mechanical profilometry, scanning electron microscopy (SEM), energy-dispersive X-ray spectroscopy (EDX), surface energy measurements for the substrate based on reference liquids (e.g. water, ethylene glycol), surface tension measurements for solutions and/or wettability tests such as measuring the contact angle between the solution and the substrate constituting the receiving area 3.

Then, the definition sub-step 21 comprises a phase 29 of generating the specific properties of the solution from said preparation criteria estimated in the preceding determination phases 25, 26, 27, 28. It should be remembered that these preparation criteria allow, in particular, the quantity and nature of the solid material to be applied to the surface of the receiving area of the timepiece component to be determined, in relation to which quantity and nature of the material, the viscosity, surface tension and density properties are estimated. It should be noted in particular that the quantity and nature of the material are decisive in particular for the density and viscosity properties as well as for the choice of additives which contribute to defining the surface tension of the solution.

During this generation phase 29, the viscosity property of the solution, which is determined from these preparation criteria, must be sufficiently high to prevent the spreading or even bursting of drops resulting from spraying the solution beyond the target receiving area 3 for the printing of this solution. This viscosity property is thus established in consideration of the size of the receiving area 3 and in certain alternative embodiments also in consideration of aesthetic criteria concerning the final appearance of the functional element 2. For example, for a receiving area 3 limited to a width in the order of 100 μm, the viscosity property of the solution determined defines a viscosity which must be higher than 1 cP, preferably higher than 50 cP. It should also be noted that, depending on the type of printing technology implemented in the printing method, a very high viscosity could hinder the correct performance of this method, in particular by altering the printing speed implemented therein. For example, within the scope of aerosol jet printing, a viscosity above 1,000 cP could prevent production of the aerosol jet.

In relation to the surface tension property of this solution, during this generation phase 29, such a property is adjusted in correspondence with the surface energy of the substrate in the receiving area 3. This surface tension of the solution is preferably lower than the surface energy of this substrate. This condition can be analysed by measuring both quantities. The surface energy of the substrate can be measured, for example, as a function of the contact angle with reference solvents such as water, ethylene glycol or diiodomethane. The surface tension of the solution can be determined, for example, by the pendant drop method. Alternatively, the contact angle can be measured directly between the solution and the substrate. In general, the aim is to obtain good wettability, i.e. a contact angle comprised between 0° and 90°. To obtain this condition, the surface tension of the solution can be influenced by adding wetting agents (surface tension correction additives) or by modifying the substrate of the receiving area to change the surface energy thereof. When this modification of the substrate is spatially controlled, it provides an additional benefit of defining the receiving area 3.

The property relating to the density of the solution is mainly determined by the mass fraction of the solid material composing this solution, and by the intrinsic density of this material. It is understood that a high density of the solution allows mass to be added to the timepiece component to be treated more quickly, which is an advantage in terms of industrial production. On the other hand, the quantity of solid material also determines the viscosity and in very large quantities can limit the precision or even the possibility of printing.

Subsequently, the preparation step 20 comprises a sub-step 30 of composing a mixture related to said solution as a function of the specific properties previously defined with reference to this solution. Such a sub-step 30 comprises a phase 31 of producing a base preparation containing said solid material according to the nature and quantity determined previously, and a base liquid, for example a solvent or a mixture of various solvents. Subsequently, this sub-step 30 includes a phase 32 of selecting at least one product to be added to said base preparation, said at least one product being chosen from the following products:

- surface tension correction additives such as wetting agents, and/or
- dispersing agents contributing to the stability of the dispersion of the particles of the solid material.

Next, the step 20 of preparing the solution can optionally comprise a sub-step 33 of mixing at least one selected product with the base preparation. In this sub-step 33, the one or more correction additives and/or dispersing agents is/are added to the base preparation as a function of the specific properties previously defined for the solution. More specifically, during this mixing sub-step 33, the solution should be obtained by adjusting:

- the viscosity of this solution according to the determined viscosity, by varying the proportion of the one or more selected products of the mixture, mainly the solvent as a function of the quantity and nature of the material and;
- the surface tension of this solution according to the determined surface tension, by varying the proportion of the one or more selected products of the mixture, mainly the additives, as a function of the quantity and nature of the material;

the density of this solution according to the determined density, by varying the proportion of the one or more selected products of the mixture, mainly the quantity of particles, as a function of the quantity and nature of the material.

Subsequently, the method comprises a step 34 of depositing the prepared solution on the entire surface 5 of the receiving area 3. In this embodiment, such a step 34 contributes to the construction of the functional element 2 on one or more receiving areas 3 of the balance 1 in order to modify the inertia and/or the unbalance of this balance 1 according to the rate correction value. This deposition step 34 includes a sub-step 35 of applying the prepared solution to the entire surface 5 of the receiving area 3 of the component 1. Such a sub-step 35 contributes to the application of the solution containing the material onto the component 1 in order to construct the functional element 2. Such an application sub-step 35 comprises a phase 36 of transforming the prepared solution into an aerosol when the printing technology uses an aerosol jet. This phase 36 comprises a sub-phase 37 of vaporising the prepared solution, which contributes to transforming this solution into an aerosol.

The deposition step 34 then comprises a sub-step 38 of solidifying the material of the solution applied to the surface of the receiving area 3. This sub-step 38 aims at finalising the construction of this functional element 2 applied onto the receiving area 3 of the component 1. This sub-step 38 can consist of continuing the evaporation of the solvent of the solution which began as soon as the application sub-step 35 was implemented, of thermosetting the material constituting the functional element 2 or of crosslinking this material on the surface 5 of the receiving area 3. As mentioned hereinabove, this solidification sub-step 38 preferably starts at the same time or substantially at the same time as the application sub-step 35 and ends after this application sub-step 35 has been completed, in order to improve the positioning precision of the functional element 2 in the receiving area 3.

The method can provide for a step 39 of reiterating the deposition step 34 which is implemented as many times as necessary to construct the functional element 2 on the receiving area 3 of the timepiece component 1. This functional element 2 can be in one piece or can be formed by a plurality of separate parts, such as a series of dots separated from one another for example.

Thus, thanks in particular to the preparation and the specific composition of the solution containing the material to be applied to the timepiece component 1, the method advantageously allows the functional element 2 to be printed on this component 1 in a targeted manner and with a high degree of precision. In terms of positioning, a deposit centring precision in the order of 5 μm can be achieved. This is limited more by the micro-positioning motor system than by the final mixture ejection targeting. The quantity of material added can be controlled in the nano-gram range, well below the sensitivity threshold for horological applications.

Furthermore, this printing of the functional element 2 of the inertial mass type is carried out without the production of splashes/projections subsequent to the deposition as is expected for the production of a timepiece component 1, and with a high degree of control over the deposited inertial mass. It should be noted that the production of such splashes/satellites during deposition is often the cause of contamination of the horological movement 110 and of potential malfunctions thereof. Moreover, this method allows for a homogeneous application, and thus a homogeneous distribution of mass, of the material on the timepiece component 1, regardless of whether the surface 5 of the receiving area 3 is planar or non-planar. In other words, the functional element 2 can be printed homogeneously and with the same resolution on an entire three-dimensional receiving surface 5 of an unmoving or moving timepiece component 1. Moreover, it should be noted that such a solution designed as such also contributes to:

- geometrically defining the position of the functional element 2 on the surface 5 of the receiving area 3;
- improving the aesthetics of the functional element 2 on the receiving surface 5;
- facilitating the adhesion of the functional element 2 to this surface 5, independently of any preparation of this surface 5;
- proposing a printing method that is repeatable, and
- proposing a printing method that can be industrialised.

In one example, such an invention can be implemented within the scope of an adjustment of a moment of inertia of a sprung balance-type horological resonator, such an adjustment aiming at correcting the rate of the oscillator by an order of magnitude of −5 seconds/day. It is firstly understood that the negative sign here indicates that the rate can only be corrected by reducing the oscillation frequency, as the addition of material of the invention can only increase the moment of inertia of the balance. In this context, if the mass and the radius of the felloe of a standard horological balance are being considered, it can be estimated that printing the functional element on the felloe of the balance comprising the solid material with a mass in the order of ten micrograms would allow such a correction of the rate according to the order of magnitude stated hereinabove to be obtained. For this purpose, the solution containing said functional element comprises:

- 95% by weight of the base preparation, i.e.:
  - 20% by weight of a solvent such as water, and
  - 75% by weight of the solid material such as at least one tungsten carbide nanoparticle produced by US Research Nanomaterials, Inc. and having a size comprised between 150 nm and 200 nm, and
- 5% by weight of a wetting agent such as a polyurethane additive produced by Lubrizol under the brand name Solsperse® J948.

Such a solution is configured for printing technology of the "aerosol jet" type thus allowing for a solid material flow rate in the order of 2 μg of tungsten carbide per second. The viscosity and surface tension of this solution allows the deposition to be targeted on a section of an arc of the felloe of the balance with a thickness of 300 μm. Thus, the rate of the horological resonator can be corrected within a few seconds. Moreover, it should be noted that with 75% by weight of tungsten carbide (density of 15.6 g/ml), 25% by weight of water and 5% by weight of polyurethane additive (density ~1 g/ml), the density of the solution here is in the order of 3.4 g/ml.

The invention claimed is:

1. A method for printing a functional element on a surface of a receiving area of a timepiece component of a timepiece, contributing to setting a rate of the timepiece, said method comprising:

preparing a solution containing a material constituting said functional element, said preparing comprising defining specific properties of the solution as a function of preparation criteria, said properties concerning a viscosity and a surface tension of the solution and the preparation criteria comprising:

structural modification features of the timepiece component, construction features of the functional element on said receiving area, said construction features including geometric dimensions, and mechanical, chemical, and aesthetic properties of the functional element to be constructed, structural features of the material to be applied to the receiving area, said structural features comprising aesthetic, physical, and chemical properties including a density of said material, and features of said receiving area of the component comprising geometric dimensions of the surface of the receiving area that can be covered by the functional element, mechanical and chemical properties of the material constituting the area said properties including adhesion, surface roughness, surface energy, and surface tension properties of the surface of the receiving area; and depositing, using a spraying device, said prepared solution onto the surface of the receiving area, wherein said defining comprises a phase of generating the specific properties of the solution from said preparation criteria estimated in determination phases, the preparation criteria comprising:

structural modification features of the timepiece component, construction features of the functional element on said receiving area, structural features of the material to be applied to said receiving area, features of said receiving area of the component, and features regarding a printing technology implemented in the method, and wherein during the generation phase:

the viscosity property of the solution is determined from the preparation criteria, and is sufficiently high to prevent spreading or even bursting of drops resulting from spraying the solution beyond the target receiving area for the printing of the solution, the viscosity property being established in consideration of the size of the receiving area and also in consideration of aesthetic criteria concerning the final appearance of the functional element, and the surface tension property of the solution is adjusted according to the surface energy in the receiving area of the timepiece component, the surface tension of the solution being lower than the surface energy in the receiving area.

2. The method according to claim 1, wherein the preparing comprises composing a mixture relative to said solution as a function of the defined specific properties of the solution, said composing comprising a phase of producing a base preparation containing said material and a base liquid.

3. The method according to claim 1, wherein the preparing comprises composing a mixture relative to said solution as a function of the defined specific properties of the solution, said composing comprising a phase of producing a base preparation containing said material and a base liquid, said composing including a phase of selecting at least one product to be added to said base preparation, said at least one product being chosen from:

surface tension correction additives, wetting agents, and/or dispersing agents contributing to the stability of the dispersion of the particles of the solid material.

4. The method according to claim 1, wherein the preparing the solution comprises mixing at least one selected product with the base preparation.

5. The method according to claim 1, wherein the depositing comprises applying the prepared solution to the entire surface of the receiving area.

6. The method according to claim 1, wherein the depositing comprises applying the prepared solution to the entire surface of the receiving area, the applying being carried out using printing technology of the “aerosol jet”, “high density ink jet”, “pneumatic dispensing”, “extrusion dispensing” or “super ink jet” type.

7. The method according to claim 1, wherein the depositing comprises applying the prepared solution to the entire surface of the receiving area, the applying comprising a phase of transforming the prepared solution into an aerosol when the printing technology uses an aerosol jet.

8. The method according to claim 1, wherein the depositing comprises solidifying the material of the solution applied to the surface of the receiving area.

9. The method according to claim 5, wherein the depositing comprises solidifying the material of the solution applied to the surface of the receiving area, the solidifying starting at the same time or substantially at the same time as the applying and ending after the applying has been completed.

10. The method according to claim 1, wherein the specific properties of the defining also concern a density of said solution.

11. The method according to claim 1, wherein the material comprises at least one molecular precursor or at least one particle chosen from a group comprising a metal or metal oxide particle, a monocrystalline or polycrystalline particle, an amorphous material particle, a ceramic particle, a polymer particle, a pigmented/coloured particle, a colourless particle, a translucent/transparent particle, a fluorescent particle or a phosphorescent particle.

12. The method according to claim 1, wherein the material comprises at least one particle of the nanoparticle or microparticle type.

13. The method according to claim 1, wherein the functional element applied to the surface of the receiving area of the timepiece component of the timepiece comprises a decorative/aesthetic element, an element for regulating the operation of a timepiece component, or an interfacing element.

14. The method according to claim 1, further comprising reiterating the depositing.

15. The method according to claim 1, wherein the printing is performed by an aerosol jet.

16. The method according to claim 1, wherein the printing of the functional element contributes to setting the rate of the timepiece by modifying an inertia and/or an unbalance of the timepiece component.

17. A timepiece component comprising:

at least one receiving area provided with a surface to which a functional element can be applied by the method according to claim 1.

18. The timepiece component according to claim 17, wherein the timepiece component is a balance of the timepiece comprising a regulating face provided with said at least one receiving area configured to comprise the functional element for regulating the rate of the balance.

19. The timepiece component according to claim 17, wherein the surface of each receiving area is non-planar.

20. A timepiece comprising:

the timepiece component according to claim 17.

* * * * *